(12) United States Patent
Takenouchi et al.

(10) Patent No.: US 12,464,256 B2
(45) Date of Patent: Nov. 4, 2025

(54) MEDICAL PROCESSING DEVICE, MEDICAL OBSERVATION SYSTEM, AND MEDICAL DEVICE

(71) Applicant: Sony Olympus Medical Solutions Inc., Tokyo (JP)

(72) Inventors: Yusuke Takenouchi, Tokyo (JP); Aki Mizukami, Tokyo (JP); Keisuke Takahashi, Tokyo (JP)

(73) Assignee: Sony Olympus Medical Solutions Inc., Tokyo (JP)

( * ) Notice: Subject to any disclaimer, the term of this patent is extended or adjusted under 35 U.S.C. 154(b) by 147 days.

(21) Appl. No.: 18/320,214

(22) Filed: May 19, 2023

(65) Prior Publication Data
US 2023/0421915 A1    Dec. 28, 2023

(30) Foreign Application Priority Data
Jun. 27, 2022    (JP) ................................. 2022-102945

(51) Int. Cl.
*H04N 23/80* (2023.01)
*G06F 3/14* (2006.01)

(52) U.S. Cl.
CPC ............... *H04N 23/80* (2023.01); *G06F 3/14* (2013.01)

(58) Field of Classification Search
CPC ...... H04N 23/80; H04N 23/63; H04N 23/667; H04N 23/74; H04N 23/76; H04N 23/71; G06F 3/14; G06F 3/147; A61B 1/0638; A61B 1/00006; A61B 1/000095; A61B 1/00057; A61B 1/000094; G09G 2330/12; G09G 2380/08
See application file for complete search history.

(56) References Cited

U.S. PATENT DOCUMENTS

| | | | | |
|---|---|---|---|---|
| 2003/0045778 A1* | 3/2003 | Ohline | ................. | A61B 1/0057 600/114 |
| 2004/0105663 A1* | 6/2004 | Kim | ....................... | G09G 3/006 348/E17.005 |
| 2005/0093988 A1* | 5/2005 | Haas | ...................... | H04N 23/60 348/E5.042 |
| 2005/0168613 A1* | 8/2005 | Taniguchi | ............ | H04N 23/651 348/333.09 |
| 2007/0093688 A1* | 4/2007 | Enomoto | ........... | A61B 1/00009 600/101 |
| 2013/0176410 A1* | 7/2013 | Takahashi | .......... | A61B 1/00018 348/65 |
| 2013/0278739 A1* | 10/2013 | Tanaka | ............... | A61B 1/00057 348/72 |

(Continued)

FOREIGN PATENT DOCUMENTS

| | | |
|---|---|---|
| JP | 2010-004979 A | 1/2010 |
| JP | 2016-042981 A | 4/2016 |

*Primary Examiner* — Timothy R Newlin
(74) *Attorney, Agent, or Firm* — XSENSUS LLP

(57) ABSTRACT

A medical processing device includes: an internal module configured to process a captured image obtained by imaging a subject and generates a display image; and a processor configured to control an operation of the internal module. The internal module is configured to perform, after an abnormality occurs in the processor, processing corresponding to a display mode designated by the processor before the abnormality occurs in the processor on the captured image.

12 Claims, 4 Drawing Sheets

(56) References Cited

U.S. PATENT DOCUMENTS

| | | | |
|---|---|---|---|
| 2015/0054855 A1* | 2/2015 | Sato | G09G 5/14 |
| | | | 345/661 |
| 2016/0309983 A1* | 10/2016 | Suzuki | H04N 17/002 |
| 2017/0208267 A1* | 7/2017 | Tsutsui | H04N 23/56 |
| 2019/0269298 A1* | 9/2019 | Kiba | G16H 40/63 |
| 2022/0104896 A1* | 4/2022 | Shelton, IV | A61B 90/361 |
| 2022/0294887 A1* | 9/2022 | Bailly | H04M 1/24 |
| 2023/0121709 A1* | 4/2023 | Xu | A61B 1/00039 |
| | | | 600/103 |

* cited by examiner

MEDICAL PROCESSING DEVICE, MEDICAL OBSERVATION SYSTEM, AND MEDICAL DEVICE

CROSS-REFERENCE TO RELATED APPLICATION

This application claims priority from Japanese Application No. 2022-102945, filed on June 27, 2022, the contents of which are incorporated by reference herein in its entirety.

BACKGROUND

The present disclosure relates to a medical processing device, a medical observation system, and a medical device.

In a related art, in the medical field, a medical observation system that displays a captured image obtained by imaging a subject on a display device and observes the subject is known (See, for example, JP 2010-4979 A).

The medical observation system (endoscope system) described in JP 2010-4979 A includes a digital image processing circuit that executes image processing on a captured image, and an alternative digital image processing circuit that is an alternative to the digital image processing circuit. Then, in the medical observation system, when an abnormality occurs in the digital image processing circuit, the alternative digital image processing circuit is operated, and image processing is executed on the captured image in the alternative digital image processing circuit. Further, in the medical observation system, when the digital image processing circuit is initialized and returns to the normal operation, the digital image processing circuit executes image processing on the captured image.

SUMMARY

In the medical observation system described in JP 2010-4979 A, when an abnormality occurs in the digital image processing circuit during surgery or a procedure, the digital image processing circuit is initialized. That is, since the digital image processing circuit is initialized, there is a case where the captured image may not be displayed on the display device in a desired display mode in which the surgery or the procedure may be continued after the initialization. In such a case, a user such as an operator needs to perform an operation of resetting the desired display mode again.

Therefore, there is a need for a technique capable of continuing surgery or a procedure without unnecessary operation by a user such as an operator and improving convenience.

According to one aspect of the present disclosure, there is provided a medical processing device including: an internal module configured to process a captured image obtained by imaging a subject and generates a display image; and a processor configured to control an operation of the internal module, wherein the internal module is configured to perform, after an abnormality occurs in the processor, processing corresponding to a display mode designated by the processor before the abnormality occurs in the processor on the captured image.

DETAILED DESCRIPTION

Figure 1:
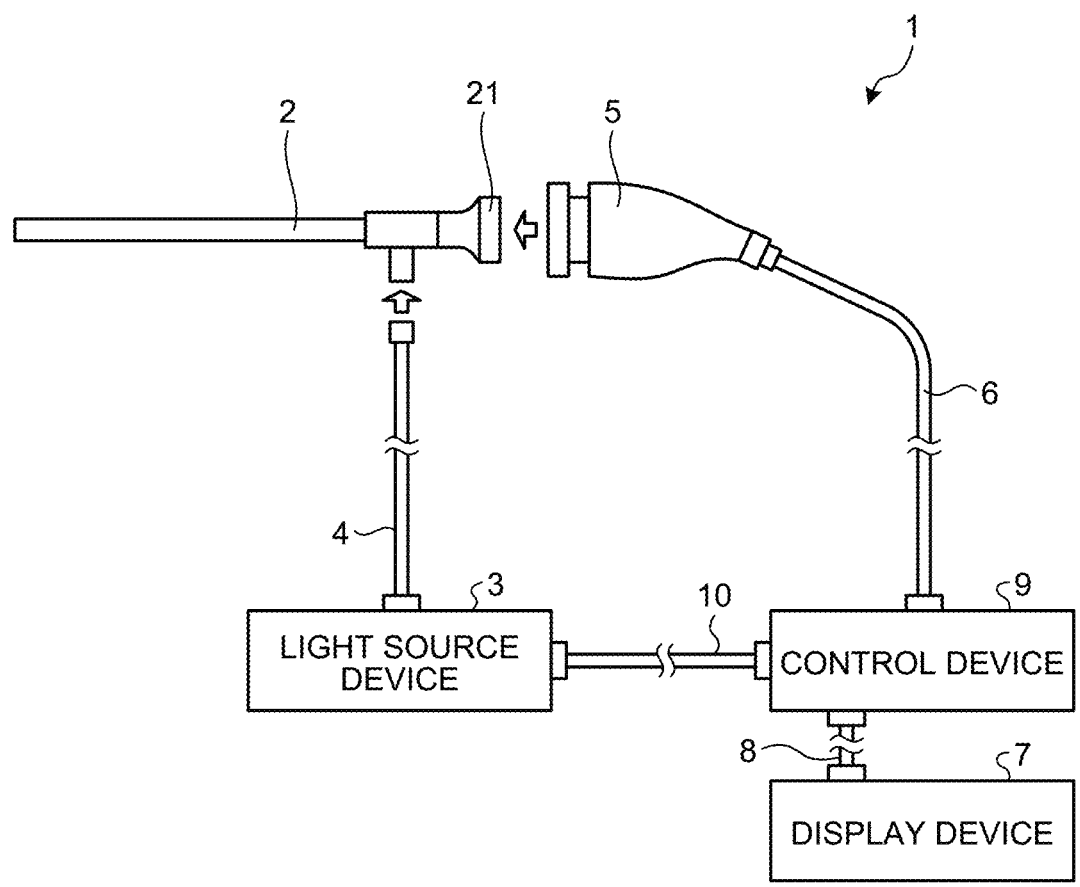
FIG. 1 is a diagram illustrating a medical observation system according to a first embodiment.

Hereinafter, modes for carrying out the present disclosure (hereinafter, embodiments) will be described with reference to the drawings. Note that the present disclosure is not limited by the embodiments described below. Furthermore, in the description of the drawings, the same portions are denoted by the same reference numerals.

FIG. 1 is a diagram illustrating a medical observation system 1 according to a first embodiment. The medical observation system 1 is a system that is used in the medical field and observes the inside of a subject (in vivo). As illustrated in FIG. 1, the medical observation system 1 includes an insertion unit 2, a light source device 3, a light guide 4, a camera head 5, a first transmission cable 6, a display device 7, a second transmission cable 8, a control device 9, and a third transmission cable 10.

In the first embodiment, the insertion unit 2 includes a rigid endoscope. That is, the insertion unit 2 has an elongated shape that is entirely rigid or partially soft and partially rigid, and is inserted into the living body. An optical system (not illustrated) configured using one or a plurality of lenses and configured to condense a subject image is provided in the insertion unit 2.

The light source device 3 is connected to one end of the light guide 4, and supplies the illumination light designated by the control device 9 to the one end of the light guide 4 with the light amount designated by the control device 9 under the control of the control device 9. The light source device 3 includes first to third light source units 31 to 33 and a light source control unit 34 (see FIG. 2).

Under the control of the light source control unit 34, the first light source unit 31 emits white light (normal light) that is visible light to supply the white light of the light amount designated by the light source control unit 34 to the light guide 4 as the illumination light. The first light source unit 31 is configured using a collimator lens, a white light emitting diode (LED), a drive driver, and the like. As the first light source unit 31, white light of visible light may be supplied by simultaneously emitting light using a red LED, a green LED, and a blue LED. The first light source unit 31 may be configured with a halogen lamp, a xenon lamp, or the like.

Under the control of the light source control unit 34, the second light source unit 32 emits first narrow band light to supply the first narrow band light of the light amount designated by the light source control unit 34 to the light guide 4 as the illumination light. Here, the first narrow band light is light having a wavelength band of 530 nm to 550 nm (central wavelength is 540 nm). The second light source unit 32 includes a collimator lens, a green LED, a transmission filter that transmits light of 530 nm to 550 nm, a drive driver, and the like.

Under the control of the light source control unit 34, the third light source unit 33 emits second narrow band light having a wavelength band different from the first narrow band light and to supply the second narrow band light of the light amount designated by the light source control unit 34 to the light guide 4 as the illumination light. Here, the second narrow band light is light having a wavelength band of 400 nm to 430 nm (central wavelength is 415 nm). The third light source unit 33 includes a collimator lens, a semiconductor laser such as a violet laser diode (LD), a drive driver, and the like.

The light source control unit 34 includes a field programmable gate array (FPGA) or the like. Then, the light source control unit 34 includes a register 341 that stores the light source drive parameter designated by the control device 9, and controls the operation of the first to third light source units 31 to 33 using the light source drive parameter.

Here, the light source drive parameter includes a special light observation flag and a light amount (brightness evaluation value). Note that details of the light amount (brightness evaluation value) will be described later.

The special light observation flag is set to ON when the display mode of the medical observation system 1 is a special light observation mode, and is set to OFF when the display mode is a normal light observation mode.

Here, the normal light observation mode is an observation method of irradiating a biological tissue with white light (normal light) and observing the biological tissue irradiated with the white light.

The special light observation mode (narrow band imaging (NBI)) is an observation method in which a capillary vessel and a mucosal surface structure of a mucosal surface layer of a biological tissue are enhanced using the fact that hemoglobin in blood strongly absorbs light having a wavelength of around 415 nm. That is, in the special light observation mode, the biological tissue is irradiated with two narrow band lights including first narrow band light (wavelength band: 530 nm to 550 nm) and second narrow band light (wavelength band: 400 nm to 430 nm) which are easily absorbed by hemoglobin in the blood. As a result, in the special light observation mode, it is possible to perform highlight display of blood vessels and blood flow information in a deep portion of mucosa that is difficult to visually recognize with white light (normal light).

In the first embodiment, the light source device 3 is configured separately from the control device 9, but the present disclosure is not limited thereto, and a configuration in which the light source device 3 is provided in the control device 9 may be adopted.

The one end of the light guide 4 is detachably connected to the light source device 3, and the other end is detachably connected to the insertion unit 2. Then, the light guide 4 transmits the light supplied from the light source device 3 from the one end to the other end, and supplies the light to the insertion unit 2. The light supplied to the insertion unit 2 is emitted from the distal end of the insertion unit 2 and emitted into the living body. The light is irradiated into the living body, and light returned from the living body (subject image) is focused by the optical system in the insertion unit 2.

The camera head 5 corresponds to a medical observation device according to the present disclosure. The camera head 5 is detachably connected to an eyepiece 21 of the insertion unit 2. Then, the camera head 5 includes an imaging unit 51 (see FIG. 2) that captures the subject image condensed by the insertion unit 2 under the control of the control device 9 and generates an image signal (hereinafter, referred to as a captured image), an operating unit 52 (see FIG. 2), and the like.

Figure 2:
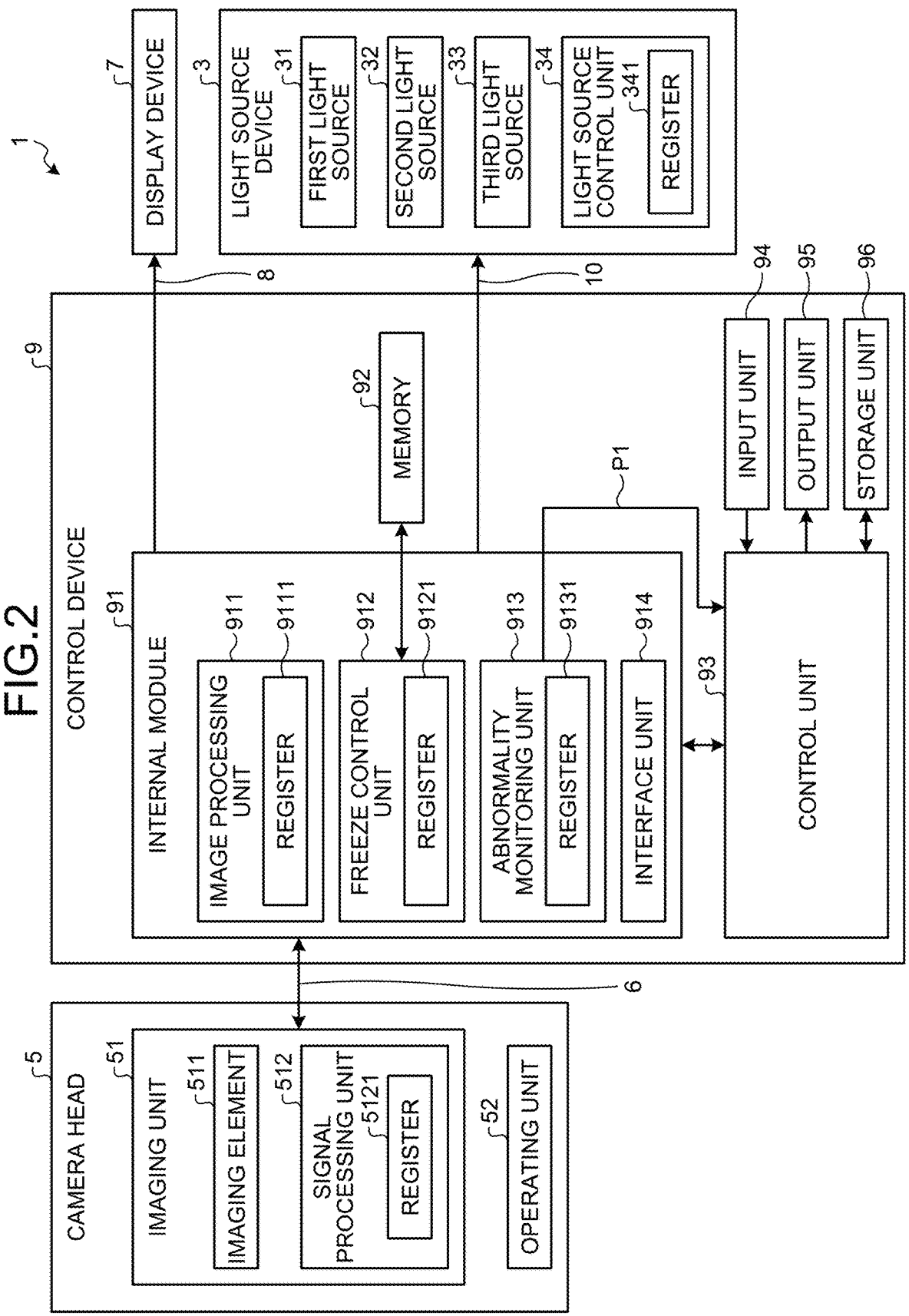
FIG. 2 is a block diagram illustrating a configuration of a control device.

As illustrated in FIG. 2, the imaging unit 51 includes an imaging element 511 and a signal processing unit 512.

The imaging element 511 is an imaging element such as a charge coupled device (CCD) or a complementary metal oxide semiconductor (CMOS) that receives the subject image condensed by the insertion unit 2 and converts the subject image into an electrical signal (analog signal).

The signal processing unit 512 performs signal processing on a captured image of an analog signal generated by the imaging element 511 and outputs a captured image of a digital signal. The signal processing unit 512 includes a register 5121 that stores an analog gain designated by the control device 9. Then, the signal processing unit 512 performs, on the captured image (analog signal) generated by the imaging element 511, processing of removing reset noise, processing of multiplying the analog signal by the analog gain stored in the register 5121, and signal processing such as A/D conversion.

The operating unit 52 is configured with buttons, switches, and the like, and receives a user operation by a user such as an operator. Then, the operating unit 52 outputs an operation signal corresponding to the user operation to the control device 9 via the first transmission cable 6. As the user operation, an operation of switching the display mode of the medical observation system 1 to one display mode between the normal light observation mode and the special light observation mode, and one display mode between the still image display mode and the moving image display mode may be exemplified.

Here, the still image display mode is a display mode in which a display image of one frame displayed on the display device 7 at the time when a user such as an operator performs an operation of switching to the still image display mode is continuously displayed on the display device 7.

The moving image display mode is a display mode in which the captured image (display image) captured by the imaging unit 51 is sequentially switched for each frame and displayed as a moving image on the display device 7.

One end of the first transmission cable 6 is detachably connected to the control device 9 and the other end is detachably connected to the camera head 5. Then, the first transmission cable 6 transmits a captured image and the like output from the camera head 5 to the control device 9, and transmits a control signal, a synchronization signal, a clock, power, and the like output from the control device 9 to the camera head 5.

Note that, in the transmission of the captured image and the like from the camera head 5 to the control device 9 via the first transmission cable 6, the captured image and the like may be transmitted as an optical signal or may be transmitted as an electric signal. The same applies to transmission of a control signal, a synchronization signal, and a clock from the control device 9 to the camera head 5 via the first transmission cable 6.

The display device 7 is configured of a display using liquid crystals, organic electro luminescence (EL), or the like, and displays an image based on a video signal from the control device 9 under the control of the control device 9.

One end of the second transmission cable 8 is detachably connected to the display device 7, and the other end is detachably connected to the control device 9. Then, the second transmission cable 8 transmits the video signal processed by the control device 9 to the display device 7.

The control device 9 corresponds to a medical processing device according to the present disclosure. The control device 9 is configured of a central processing unit (CPU), a field-programmable gate array (FPGA), and the like, and integrally controls operations of the light source device 3, the camera head 5, and the display device 7.

Note that a detailed configuration of the control device 9 will be described in "Configuration of Control Device" described later.

One end of the third transmission cable 10 is detachably connected to the light source device 3, and the other end is detachably connected to the control device 9. Then, the third transmission cable 10 transmits the control signal from the control device 9 to the light source device 3.

Next, a configuration of the control device 9 will be described.

FIG. 2 is a block diagram illustrating a configuration of the control device 9.

As illustrated in FIG. 2, the control device 9 includes an internal module 91, a memory 92, a control unit 93, an input unit 94, an output unit 95, and a storage unit 96.

The internal module 91 is configured of an FPGA and executes hardware processing. As illustrated in FIG. 2, the internal module 91 includes an image processing unit 911, a freeze control unit 912, an abnormality monitoring unit 913, and an interface unit 914.

The image processing unit 911 includes a register 9111 that stores image processing parameters, and uses the image processing parameters stored in the register 9111 to execute image processing on the captured image (digital image) output from the camera head 5 and generate a display image (video signal for display) for displaying the captured image. Then, the image processing unit 911 outputs the display image to the display device 7. As a result, the display image is displayed on the display device 7. Here, the register 9111 corresponds to an image processing parameter storage unit according to the present disclosure.

Specifically, examples of the image processing include optical black subtraction processing, demosaic processing, white balance adjustment processing, digital gain processing (processing of multiplying a digital signal by a digital gain for amplifying the digital signal), noise reduction processing, color correction processing, color enhancement processing, contour enhancement processing, enlargement processing, color tone change processing, YC processing of converting an RGB signal (captured image) into a luminance chrominance signal (Y, Cb/Cr signals), and the like.

Note that the image processing executed by the image processing unit 911 is different between a case where the display mode of the medical observation system 1 is the normal light observation mode and a case where the display mode is the special light observation mode. That is, in the case of the normal light observation mode, the register 9111 stores the image processing parameter corresponding to the normal light observation mode under the control of the control unit 93. Furthermore, in a case of the special light observation mode, the register 9111 stores the image processing parameter corresponding to the special light observation mode under the control of the control unit 93.

The freeze control unit 912 includes a register 9121 that stores a still image display flag. The still image display flag is set to ON when the display mode of the medical observation system 1 is the still image display mode, and is set to OFF when the display mode is the moving image display mode.

Then, the freeze control unit 912 checks the still image display flag stored in the register 9121, and when the still image display flag is OFF (when the display mode of the medical observation system 1 is the moving image display mode), writes the display image of one frame after the image processing is executed by the image processing unit 911 in the memory 92, and reads the display image of one frame from the memory 92 and outputs the display image to the display device 7. As a result, the display image is sequentially switched for each frame and displayed on the display device 7 as a moving image.

On the other hand, the freeze control unit 912 checks the still image display flag stored in the register 9121, and when the still image display flag is ON (when the display mode of the medical observation system 1 is the still image display mode), stops writing the display image of one frame after the image processing is executed by the image processing unit 911 in the memory 92, and reads already written one frame display image from the memory 92 and outputs the display image to the display device 7. As a result, the display image of one frame displayed on the display device 7 at substantially the same timing as the timing at which the operation for switching to the still image display mode is performed continues to be displayed as a still image.

The abnormality monitoring unit 913 is configured of, for example, a watchdog timer and the like, and monitors whether an abnormality has occurred in the control unit 93. In addition, in a case where it is determined that an abnormality has occurred in the control unit 93, the abnormality monitoring unit 913 outputs a reboot signal to the control unit 93 through a path P1 (FIG. 2) not via the interface unit 914 to be described later, and urges the control unit 93 to restart. Here, the abnormality monitoring unit 913 includes a register 9131 that stores a reboot flag. Then, when outputting the reboot signal, the abnormality monitoring unit 913 sets the reboot flag to ON. Furthermore, in a case where it is determined that an abnormality has occurred in the control unit 93, the abnormality monitoring unit 913 stops communication between the internal module 91 and the control unit 93.

In the first embodiment, the abnormality monitoring unit 913 is provided in the internal module 91, but is not limited thereto, and may be provided outside the internal module 91.

The interface unit 914 is an interface for performing communication between the internal module 91 and the control unit 93, and is an interface for performing communication between the internal module 91, the light source device 3, and the camera head 5. That is, the control of the registers 341, 5121, 9111, 9121, and 9131 by the control unit 93 is executed via the interface unit 914.

The memory 92 is a memory used by the freeze control unit 912, and stores at least one frame of display image.

The control unit 93 corresponds to a processor according to the present disclosure. The control unit 93 is implemented by executing various programs stored in the storage unit 96 by a controller such as a CPU or a micro processing unit (MPU), and executes software processing. Then, the control unit 93 controls the operations of the light source device 3 and the camera head 5, and controls the entire operation of the control device 9.

For example, the control unit 93 executes the following brightness control.

Specifically, the control unit 93 calculates a luminance level (luminance average value) in a detection region based on a luminance signal (Y signal) in the detection region that is at least a part of the entire image region of the captured image, of a luminance chrominance signal (Y, Cb/Cr signals) that is the captured image subjected to the YC processing by the image processing unit 911. Then, based on the luminance level (luminance average value) in the detection region, the control unit 93 calculates a luminance evaluation value for changing the brightness of the image in the detection region of the entire image region of the captured image to the reference brightness (changing the calculated luminance average value to the reference luminance average value).

Here, examples of the brightness evaluation value include an analog gain used in the signal processing unit 512, a digital gain used in image processing (digital gain processing) by the image processing unit 911, and the light amount of illumination light supplied by the light source device 3. Then, the analog gain stored in the register 5121 is sequentially updated to the analog gain (brightness evaluation value) calculated by the control unit 93 via the interface unit 914. In addition, the digital gain among the image processing parameters stored in the register 9111 is sequentially updated to the digital gain (brightness evaluation value) calculated by the control unit 93 via the interface unit 914. Furthermore, the light amount among the light source drive parameters stored in the register 341 is sequentially updated to the light amount (brightness evaluation value) calculated by the control unit 93 via the interface unit 914.

Then, the signal processing unit 512 executes processing using the updated analog gain, the image processing unit 911 executes digital gain processing using the updated digital gain, and the light source device 3 supplies illumination light of the updated light amount, whereby the brightness of the captured image is controlled to desired brightness.

The input unit 94 is configured using an operation device such as a mouse, a keyboard, and a touch panel, and receives a user operation by a user such as an operator. Then, the input unit 94 outputs an operation signal corresponding to the user operation to the control unit 93. The output unit 95 is configured using a speaker, a printer, or the like, and outputs various types of information.

The storage unit 96 stores a program executed by the control unit 93, information necessary for processing of the control unit 93, and the like.

Next, the operation of the control device 9 will be described.

Figure 3:
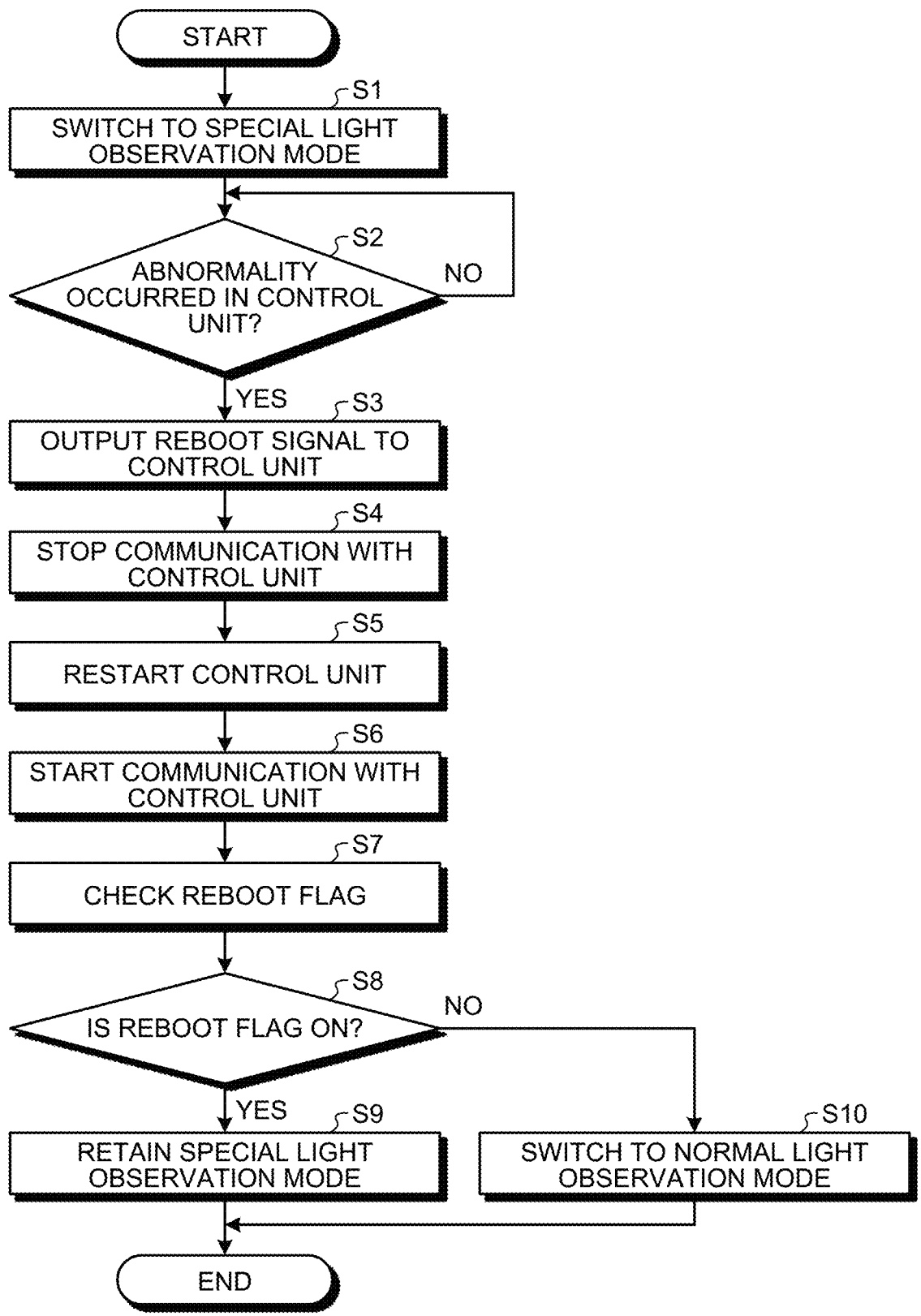
FIG. 3 is a flowchart illustrating an operation of the control device.

FIG. 3 is a flowchart illustrating an operation of the control device 9.

Hereinafter, as an operation of the control device 9, a case where an abnormality occurs in the control unit 93 when the display mode of the medical observation system 1 is the special light observation mode will be described. Note that, in FIG. 3, for convenience of description, the description of the brightness control executed by the control unit 93 is omitted, but the brightness control is executed before abnormality occurs in the control unit 93 and after restart.

First, the control unit 93 switches the display mode of the medical observation system 1 to the special light observation mode in response to an operation of "switching the display mode of the medical observation system 1 to the special light observation mode" to the operating unit 52 by the user such as the operator (Step S1). Specifically, the control unit 93 sets the special light observation flag included in the light source drive parameter stored in the register 341 to ON via the interface unit 914. As a result, the light source control unit 34 checks that the special light observation flag included in the light source drive parameter stored in the register 341 is ON, and causes the second and third light source units 32 and 33 among the first to third light source units 31 to 33 to supply the first and second narrow band lights as the illumination light. In addition, the control unit 93 updates the image processing parameter stored in the register 9111 to the image processing parameter corresponding to the special light observation mode via the interface unit 914. As a result, the image processing unit 911 executes image processing on the captured image (digital image) obtained by imaging the biological tissue irradiated with the first and second narrow band lights, using the image processing parameter corresponding to the special light observation mode, and generates a display image.

After step S1, the abnormality monitoring unit 913 constantly monitors whether an abnormality has occurred in the control unit 93 (step S2).

When it is determined that no abnormality has occurred in the control unit 93, the abnormality monitoring unit 913 continues the process of step S2.

On the other hand, when it is determined that an abnormality has occurred in the control unit 93, the abnormality monitoring unit 913 outputs a reboot signal to the control unit 93 through the path P1 not via the interface unit 914 to urge the control unit 93 to restart (step S3). Then, the abnormality monitoring unit 913 sets the reboot flag stored in the register 9131 to ON. Note that an IC chip may be provided between the internal module 91 and the control unit 93 in the path P1 not via the interface unit 914. In this case, the internal module 91 (abnormality monitoring unit 913) is configured to output a reboot signal to the control unit 93 via the IC chip.

After step S3, the abnormality monitoring unit 913 stops communication between the internal module 91 and the control unit 93 via the interface unit 914 (step S4). That is, the control unit 93 may not execute control of the registers 341, 5121, 9111, 9121, and 9131 via the interface unit 914. As a result, the light source drive parameters (the special light observation flag and the light amount (brightness evaluation value)), the analog gain (brightness evaluation value), the image processing parameters (image processing parameters (including digital gain (brightness evaluation value)) according to the special light observation mode), and the still image display flag stored in the registers 341, 5121, 9111, and 9121 are held at the setting values before the abnormality occurs in the control unit 93. Then, the light source device 3, the camera head and the internal module 91 continue the processing using the light source drive parameters (the special light observation flag and the light amount (brightness evaluation value)), the analog gain (brightness evaluation value), the image processing parameter (image processing parameters (including digital gain (brightness evaluation value)) according to the special light observation mode), and the still image display flag stored in the registers 341, 5121, 9111, and 9121. The light source drive parameter (the special light observation flag and the light amount (brightness evaluation value)), the analog gain (brightness evaluation value), the image processing parameter (image processing parameters (including digital gain (brightness evaluation value)) according to the special light observation mode), and the still image display flag correspond to the operation parameters according to the present disclosure. That is, the light source device 3, the camera head 5, and the internal module 91 correspond to a medical device according to the present disclosure.

After step S4, the control unit 93 executes restart (step S5).

After step S5, when link-up is performed between the internal module 91 and the control unit 93 via the interface unit 914, the abnormality monitoring unit 913 starts communication between the internal module 91 and the control unit 93 via the interface unit 914 (step S6).

After step S6, the control unit 93 checks the reboot flag stored in the register 9131 via the interface unit 914 (step S7).

In a case where the reboot flag is set to ON (step S8: Yes), the control unit 93 retains the display mode of the medical observation system 1 in the special light observation mode (step S9). That is, the control unit 93 does not change the setting of the special light observation flag stored in the register 341 and the setting of the image processing parameter stored in the register 9111 via the interface unit 914.

On the other hand, when the reboot flag is set to OFF (step S8: No), that is, when the abnormality monitoring unit 913 does not prompt the restart by the reboot signal (for example, in the case of power activation or the like), the control unit 93 switches the display mode of the medical observation system 1 to the normal light observation mode (step S10). That is, the control unit 93 sets the special light observation flag included in the light source drive parameter stored in the register 341 to OFF via the interface unit 914. As a result, the light source control unit 34 confirms that the special light observation flag included in the light source drive parameter stored in the register 341 is OFF, and causes the first light source unit 31 among the first to third light source units 31 to 33 to supply white light (normal light) as illumination light. In addition, the control unit 93 updates the image processing parameter stored in the register 9111 to the image processing parameter corresponding to the normal light observation mode via the interface unit 914. As a result, the image processing unit 911 executes image processing on the captured image (digital image) obtained by imaging the biological tissue irradiated with the white light (normal light), using the image processing parameter corresponding to the normal light observation mode, and generates a display image.

According to the first embodiment described above, the following effects are obtained.

In the control device 9 according to the first embodiment, in a case where an abnormality occurs in the control unit 93, the internal module 91 performs processing corresponding to the display mode designated by the control unit 93 before the abnormality occurs in the control unit 93 on the captured image. Specifically, when an abnormality occurs in the control unit 93 in the special light observation mode, the internal module 91 performs processing corresponding to the special light observation mode on the captured image during and after the restart of the control unit 93.

Therefore, even in a case where an abnormality occurs in the control unit 93 when an operation or a procedure is performed in the special light observation mode, a display state (special light observation mode) equivalent to that before the abnormality occurs in the control unit 93 may be maintained during and after the restart of the control unit 93.

Therefore, with the control device 9 according to the first embodiment, it is possible for a user such as an operator to continue an operation or a procedure without performing an unnecessary operation, and it is possible to improve convenience.

In particular, when an abnormality occurs in the control unit 93, communication between the internal module 91 and the control unit 93 is stopped. As a result, the light source drive parameters (the special light observation flag and the light amount (brightness evaluation value)), the analog gain (brightness evaluation value), the image processing parameters (image processing parameters (including digital gain (brightness evaluation value)) according to the special light observation mode), and the still image display flag stored in the registers 341, 5121, 9111, and 9121 are held at the setting values before the abnormality occurs in the control unit 93. That is, since the image processing parameter and the brightness evaluation value are held in the state before the abnormality of the control unit 93 occurs, the high-definition and bright image display may be maintained even during and after the restart of the control unit 93.

Next, a second embodiment will be described.

Hereinafter, the same reference numerals are given to the same configurations as those of the above-described first embodiment, and the detailed description thereof will be omitted or simplified.

This second embodiment is different from the first embodiment in the operation of the control device 9.

Hereinafter, the operation of the control device 9 according to the second embodiment will be described.

Figure 4:
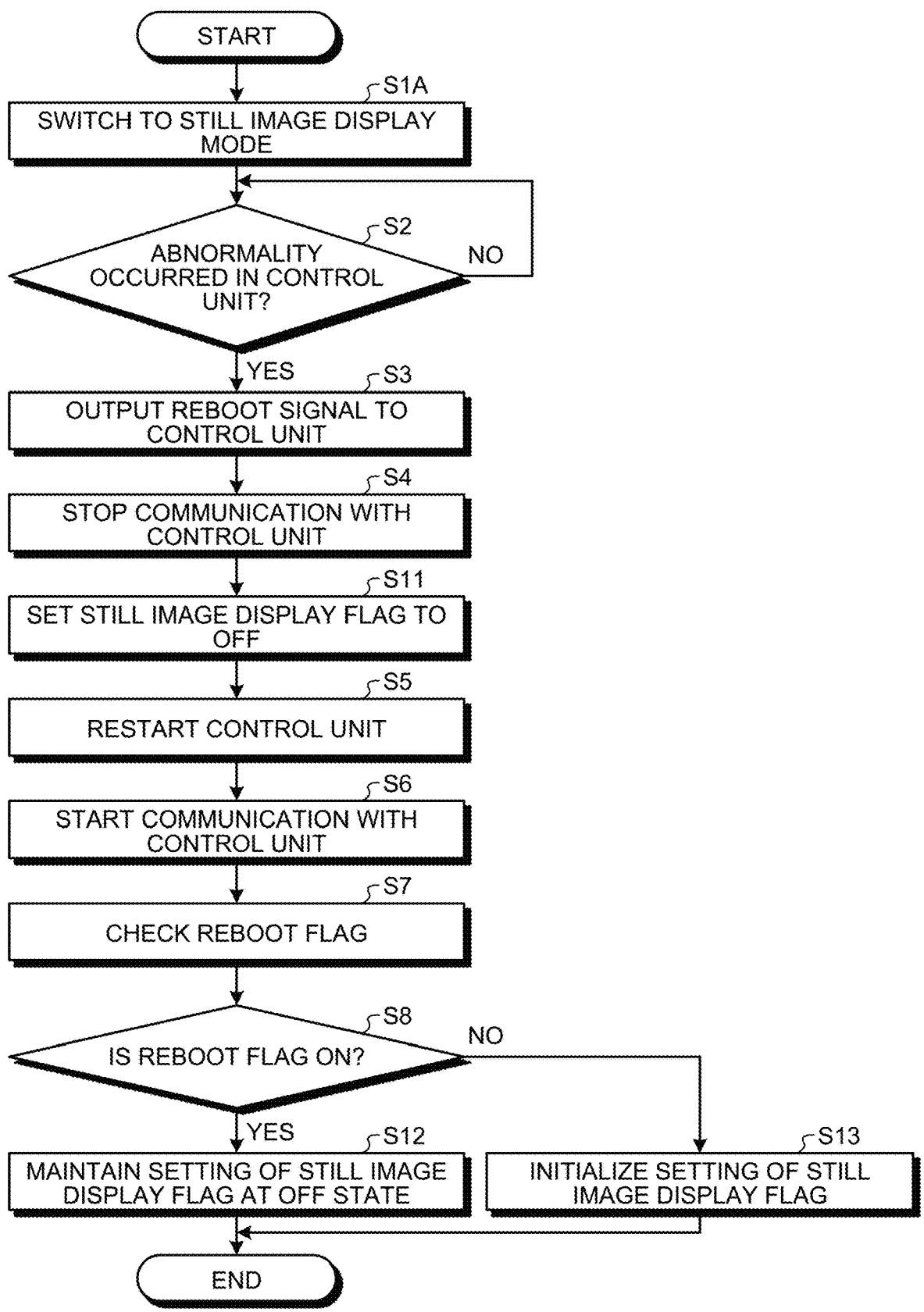
FIG. 4 is a flowchart illustrating an operation of a control device according to a second embodiment.

FIG. 4 is a flowchart illustrating an operation of the control device 9 according to the second embodiment.

Hereinafter, as an operation of the control device 9, a case where an abnormality occurs in the control unit 93 when the display mode of the medical observation system 1 is the still image display mode will be described. Note that, in FIG. 4, for convenience of description, description of the brightness control executed by the control unit 93 is omitted, but the brightness control is executed before abnormality occurs in the control unit 93 and after restart.

In the operation of the control device 9 according to the second embodiment, as illustrated in FIG. 4, step SlA is adopted instead of step Si in the operation of the control device 9 described in the above-described first embodiment. In the operation of the control device 9 according to the second embodiment, steps S9 and S10 are omitted, and steps Sll to S13 are added. Therefore, steps SlA and Sll to S13 will be mainly described below.

First, in step S1A, the control unit 93 switches the display mode of the medical observation system 1 to the still image display mode in response to an operation of "switching the display mode of the medical observation system 1 to the still image display mode" to the operating unit 52 by the user such as the operator. Specifically, the control unit 93 sets the still image display flag stored in the register 9121 to ON via the interface unit 914. As a result, the freeze control unit 912 confirms that the still image display flag stored in the register 9121 is ON, stops writing the one-frame display image after the image processing is executed by the image processing unit 911 to the memory 92, reads the already-written one-frame display image from the memory 92, and outputs the image to the display device 7. Then, on the display device 7, the display image of one frame displayed on the display device 7 at substantially the same timing as the timing at which the operation for switching to the still image display mode is performed continues to be displayed as a still image.

Step S11 is executed after step S4.

Specifically, in step S11, for example, the freeze control unit 912 stores the OFF value of the still image display flag in another address area in the register 9121, and receives the still image display flag stored in another address area in the register 9121 when the abnormality monitoring unit 913 notifies that an abnormality has occurred in the control unit 93. As a result, the freeze control unit 912 confirms that the still image display flag stored in the register 9121 is OFF (confirms that the display mode of the medical observation system 1 has been switched to the moving image display mode), writes the display image of one frame after the image processing is executed by the image processing unit 911 in the memory 92, reads the display image of one frame from the memory 92, and outputs the display image to the display device 7. Then, on the display device 7, the display of the display image is sequentially switched for each frame and displayed as a moving image. As another configuration, the same may be achieved by a configuration in which the abnormality monitoring unit 913 sets the still image display flag stored in the register 9121 to OFF, in step S11. This eliminates the need to branch the processing between the normal state and the abnormal state in the freeze control unit 912.

Thereafter, the control device 9 proceeds to step S5.

Step S12 is executed when the reboot flag is set to ON (step S8: Yes).

Specifically, in step S12, the control unit 93 maintains the setting of the still image display flag stored in the register 9121. That is, in step S11, the still image display flag is set to OFF. Therefore, in step S12, the setting of the still image display flag is maintained in an OFF state. In other words, the display mode of the medical observation system 1 is maintained in the moving image display mode.

Step S13 is executed when the reboot flag is set to OFF (step S8: No).

Specifically, in step S13, the control unit 93 initializes the setting of the still image display flag stored in the register 9121 via the interface unit 914. In other words, the display mode of the medical observation system 1 is switched to the display mode set by default between the still image display mode and the moving image display mode.

According to the second embodiment described above, the following effects are obtained in addition to the same effects as those of the first embodiment described above.

In the control device 9 of the second embodiment, when an abnormality occurs in the control unit 93 in the still image display mode, the internal module 91 sets the still image display flag to OFF (switches to the moving image display mode).

That is, even when an abnormality occurs in the control unit 93 in the still image display mode, the mode is switched to the moving image display mode, and thus, it is possible for a user such as an operator to continue an operation or a procedure without performing an unnecessary operation, and it is possible to improve convenience.

Although the embodiments for carrying out the present disclosure have been described so far, the present disclosure should not be limited only by the first and the second embodiments described above.

In the first and the second embodiments described above, the medical processing device and the medical device according to the present disclosure are mounted on the medical observation system 1 in which the insertion unit 2 is configured by a rigid endoscope, but the present disclosure is not limited thereto. For example, the medical processing device and the medical device according to the present disclosure may be mounted on a medical observation system in which the insertion unit 2 is constituted by a flexible endoscope. In addition, the medical processing device and the medical device according to the present disclosure may be mounted on a medical observation system such as a surgical microscope (see, for example, JP 2016-42981 A) that enlarges and observes a predetermined field of view of the inside of a living body or a surface of the living body.

In the first and the second embodiments described above, the internal module 91 is configured by an FPGA and is configured to execute hardware processing, but the present disclosure is not limited thereto, and may be configured by a controller such as a CPU or an MPU and may be configured to execute software processing. Furthermore, the control unit 93 is configured of a controller such as a CPU or an MPU and is configured to execute software processing, but is not limited thereto, and may be configured of an FPGA or the like and be configured to execute hardware processing.

In the first and the second embodiments described above, the special light observation mode is adopted as the display mode of the medical observation system 1, but the present disclosure is not limited thereto, and a fluorescence observation mode may be adopted instead of the special light observation mode.

Here, the fluorescence observation mode is an observation method to observe the inside of a subject by irradiating the subject with an excitation light that excites a fluorescent substance in the subject and capturing the fluorescence generated from the fluorescent substance.

In the first and second embodiments described above, the three light sources including the first to third light source units 31 to 33 are adopted as the configuration of the light source device 3, but the present disclosure is not limited thereto. For example, a configuration may be adopted in which only one light source is provided, and a transmission filter that transmits light in a specific wavelength band and blocks other light is moved into and out of an optical path of light emitted from the light source to switch between white light (normal light observation mode) and first and second narrow band light (special light observation mode).

Note that the following configurations also belong to the technical scope of the present disclosure.

With the medical processing device, the medical observation system, and the medical device according to the present disclosure, convenience may be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medical processing device comprising:
    an internal module configured to process a captured image obtained by imaging a subject and generate a display image; and
    a processor configured to control an operation of the internal module, wherein the internal module includes
        an image processing parameter memory configured to store an image processing parameter corresponding to a display mode designated by the processor, and
        an image processor configured to perform image processing on the captured image by using the image processing parameter stored in the image processing parameter memory, and
        the display mode includes a first display mode and a second display mode, the first display mode is a default display mode, and
    the image processor is configured to perform, after an abnormality occurs in the processor during the second display mode and the processor is restarted, image processing on the captured image using the image processing parameter stored in the image processing parameter memory, wherein
    the first display mode is a normal light observation mode of irradiating the subject with normal light and a second display mode is a special light observation mode of irradiating the subject with special light in a specific wavelength band, and
    when the processor is in the special light observation mode, the image processor is configured to perform, after an abnormality occurs in the processor, processing according to the special light observation mode on the captured image.

2. The medical processing device according to claim 1, wherein the internal module is configured to perform hardware processing, and the processor is configured to perform software processing.

3. The medical processing device according to claim 1, further comprising an abnormality monitoring circuit configured to monitor whether the abnormality has occurred in the processor.

4. The medical processing device according to claim 1, wherein the processor is restarted when no abnormality has occurred in the processor, the processor is configured to set the display mode to the first display mode.

5. A medical processing device comprising:
   an internal module configured to process a captured image obtained by imaging a subject and generate a display image; and
   a processor configured to control an operation of the internal module, wherein
   the internal module is configured to perform, after an abnormality occurs in the processor, processing corresponding to a display mode designated by the processor before the abnormality occurs in the processor on the captured image, wherein
   the display mode includes:
      a still image display mode for causing a display device to display the display image as a still image; and
      a moving image display mode for causing the display device to display the display image as a moving image, and
   the internal module is configured to switch the display mode to the moving image display mode in a case where an abnormality occurs in the processor in the still image display mode.

6. A medical observation system comprising:
   a medical camera configured to capture an image of a subject and generates a captured image;
   a medical processor configured to process the captured image and generate a display image; and
   a display configured to display the display image, wherein
   the medical processor includes:
   an internal module configured to process the captured image and generate the display image; and
   a processor configured to control an operation of the internal module, wherein
   the internal module includes
      an image processing parameter memory configured to store an image processing parameter corresponding to a display mode designated by the processor, and
      an image processor configured to perform image processing on the captured image by using the image processing parameter stored in the image processing parameter memory,
   the display mode includes a first display mode and a second display mode,
   the first display mode is a default display mode, and
   the image processor is configured to perform, after an abnormality occurs in the processor during the second display mode and the processor is restarted, image processing on the captured image using the image processing parameter stored in the image processing parameter memory, wherein
   the first display mode is a normal light observation mode of irradiating the subject with normal light and a second display mode is a special light observation mode of irradiating the subject with special light in a specific wavelength band, and
   when the processor is in the special light observation mode, the image processor is configured to perform, after an abnormality occurs in the processor, processing according to the special light observation mode on the captured image.

7. The medical observation system according to claim 6, wherein
   the internal module is configured to perform hardware processing, and
   the processor is configured to perform software processing.

8. The medical observation system according to claim 6, further comprising an abnormality monitoring circuit configured to monitor whether the abnormality has occurred in the processor.

9. The medical observation system according to claim 6, wherein the processor is restarted when no abnormality has occurred in the processor, the processor is configured to set the display mode to the first display mode.

10. A non-transitory computer readable storage device having computer readable instructions that when executed by circuitry cause the circuitry to:
    designate a display mode as one of a first display mode and a second display mode, the first display mode being a default display mode;
    store an image processing parameter corresponding to the designated display mode;
    perform image processing on a captured image by imaging a subject using the image processing parameter stored;
    determine whether an abnormality has occurred in a processor that controls the image processing;
    in response to the abnormality having occurred in the processor, restart the processor, otherwise continue image processing; and
    on condition that the second display mode is the designated display mode and the processor is restarted due to the abnormality, perform image processing on the captured image using the image processing parameter stored, otherwise store and use image processing parameters for the first display mode, wherein
    the first display mode is a normal light observation mode of irradiating the subject with normal light and a second display mode is a special light observation mode of irradiating the subject with special light in a specific wavelength band, and
    when the display mode is the special light observation mode, the circuitry is configured to perform, after an abnormality occurs in the processor, processing according to the special light observation mode on the captured image.

11. The non-transitory computer readable storage device according to claim 10, wherein the processor is restarted when no abnormality has occurred in the processor, the circuitry is configured to designate the first display mode.

12. The non-transitory computer readable storage device according to claim 10, wherein the circuitry is further configured to monitor whether the abnormality has occurred in the processor.

* * * * *